United States Patent Office 3,272,754
Patented Sept. 13, 1966

3,272,754
DRY CLEANING AGENTS FOR TEXTILE
MATERIALS
Gaston Jaccard, Basel, Switzerland, assignor to Sandoz Ltd., Basel, Switzerland
No Drawing. Filed July 9, 1962, Ser. No. 208,627
Claims priority, application Switzerland, Aug. 8, 1961, 9,300/61; Aug. 18, 1961, 9,675/61; Apr. 26, 1962, 5,030/62
18 Claims. (Cl. 252—161)

The present invention relates to new and useful dry cleaning agents for textile materials.

In the dry cleaning of textiles, especially articles of clothing, so-called cleaning "intensifiers" are added to the organic solvent (cleaning fluid proper). The function of the intensifiers is, among other things, to disperse or to dissolve a certain quantity of water in the organic solvent, it having been found that such small amounts of water suffice to effect removal from the material being dry cleaned of water-soluble or water-dispersible soil, whereby a subsequent wet washing is totally or partly rendered unnecessary.

In the more recent methods, the requisite amount of water is added directly to the cleaning bath by means of an automatic dosing device, it being important in this connection that such water be homogeneously taken up by the organic solvent as rapidly as possible; otherwise there is a danger that undissolved drops of water will result in spot shrinkages in the material being cleaned.

The present invention is concerned with an organic solvent which is suitable for dry cleaning and which has enhanced water-absorbing capacity. This organic solvent is characterized by a content of:

(a) A salt of an alkylarylsulfonic acid with a multivalent metal, especially calcium, and
(b) A non-ionic surface active compound, especially a surface active polyglycol ether.

Such solvents, particularly those which are based on chlorinated hydrocarbons, such for example as perchlorethylene, have a high absorption capacity for water. Perchlorethylene, which e.g. contains 2 to 6 grams per liter of the components (a) and (b), supra, can dissolve 2 to 6 milliliters of water per liter with formation of a clear solution and up to 9 milliliters of water per liter with formation of an opalescent solution. The situation is essentially the same for the other solvents which can be used according to this invention. The take-up of the water takes place in a short time (5 to 60 seconds) even with relatively weak stirring.

Particularly suitable organic solvents are those which contain, as indispensible ingredients, the neutral calcium salt of a dodecylbenzenesulfonic acid and an alkyl- or alkylaryl- polyglycol ether of the type known as washing and wetting agents, for example laurylheptaglycolether, octylphenyldecaglycolether, nonylphenyldecaglycolether, diamylphenyldodecaglycolether, oleylpentadecaglycolether and the like.

Ingredients (a) and (b) are advantageously incorporated into the organic solvent in substantially equal parts by weight relatively to each other. However, one or the other of (a) and (b) may be in excess with respect to the other. Thus the ratio of salt to surfactant may range from about 1:2 to 2:1 by weight.

The following examples set forth presently preferred illustrative embodiments of the present invention. Percentages therein are by weight. The relationship between parts by weight and parts by volume is as that between grams and milliliters,

Example 1

101 parts by weight of anhydrous neutral calcium salt, prepared by neutralizing commercial dodecylbenzenesulfonic acid with calcium hydroxide and drying, are intimately admixed with 80 parts by weight of technical oleylpentadecaglycolether

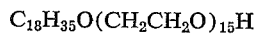

$$C_{18}H_{35}O(CH_2CH_2O)_{15}H$$

3.6 parts by weight of the obtained mixture are dissolved in 1000 parts by volume of perchlorethylene, yielding a clear solution, in which 3 parts by volume of water can be dissolved by stirring at room temperature (about 15° C. to about 30° C.) within 20 seconds without impairing the clarity of the solution. In like manner, 6 parts by volume of water can be dissolved in the aforesaid perchlorethylene solution within 60 seconds, again without disturbing the clarity of the solution.

The employed commercial dodecylbenzenesulfonic acid contains, by weight:

97–98% of dodecylbenzenesulfonic acid having an average molecular weight of 326,
1–2% of unsulfonates, and about 1% of sulfuric acid.

The drying of the calcium salt can advantageously be carried out in the polyglycol ether with which the calcium salt is to be combined.

Example 2

67 parts by weight of calcium dodecylbenzenesulfonate, of the type described in Example 1, are intimately admixed with 120 parts by weight of technical diamylphenyldodecaglycol ether.

3.7 parts by weight of the obtained mixture are dissolved in 1000 parts by volume of perchlorethylene, yielding a clear solution in which 6 milliliters of water can be dissolved within 5 to 10 seconds, by stirring at room temperature, to give an opalescent solution.

The diamylphenyldodecaglycol ether can be replaced by a corresponding quantity of lauryloctaglycol ether, a similarly acting solution being obtained.

Example 3

50 parts by weight of calcium dodecylbenzenesulfonate, of the type described in Example 1, are intimately admixed with 60 parts by weight of technical isooctylphenyldecaglycol ether.

3 parts by weight of the so-obtained mixture are dissolved in 1000 parts by volume of perchloethylene, yielding a clear solution in which, with mild stirring at room temperature, 3 parts by weight of water can be dissolved in less than 30 seconds to give a clear to opalescent solution. The perchloroethylene can be replaced by the corresponding quantity of trichlorethylene, with like results.

By increasing the quantity of isooctylphenyldecaglycol ether in this example to 70 parts by weight, an even more active mixture is obtained.

Example 4

67 parts by weight of calcium dodecylbenzenesulfonate, as described in Example 1, are intimately admixed with 120 parts by weight of nonylphenyldecaglycol ether.

3.7 parts by weight of the so-obtained mixture are dissolved in 1000 parts by volume of perchlorethylene, yielding a clear solution in which, with stirring at room temperature, 3 parts by volume of water dissolve within 10 seconds without impairing the clarity of the solution.

Example 5

139 parts by weight of magnesium dodecylbenzenesulfonate, prepared after the manner disclosed in Example 1 for preparing the calcium dodecylbenzenesulfonate but replacing the calcium hydroxide by magnesium hydroxide, are intimately admixed with 133 parts by weight of diamylphenyldodecaglycol ether.

2.7 parts by weight of the so-obtained mixture are dissolved in 1000 parts by volume of perchlorethylene, yielding a solution in which 2 parts by weight of water can be dissolved, with stirring at room temperature, within one minute to yield an opalescent solution.

The same result is obtained if, in this example, the 133 parts by weight of diamylphenyldecaglycol ether are replaced by 133 parts by weight of oleylpentadecaglycol ether.

*Example 6*

55 parts by weight of a neutral calcium salt obtained by neutralization of the salt-free dibutylnaphthalenesulfonic acid with calcium hydroxide are intimately admixed with 45 parts by weight of technical isooctylphenyldecaglycol ether.

6 parts by weight of the so-obtained mixture are dissolved in 1000 parts by volume of perchlorethylene, yielding a clear solution in which 3 parts by weight of water can be dissolved, with stirring at room temperature, within 20 seconds to yield a clear to opalescent solution.

The dibutylnaphthalenesulfonic acid is advantageously prepared from technical sodium dibutylnaphthalenesulfonate by treatment of the latter with hydrochloric acid in ether.

*Example 7*

61 parts by weight of damp calcium nonylnaphthalenesulfonate are intimately admixed with 39 parts by weight of isooctylphenyldecaglycol ether.

6 parts by weight of the so-obtained mixture are dissolved in 1000 parts by volume of perchlorethylene, yielding a solution in which 3 parts by weight of water can be dissolved, with mild stirring at room temperature, in 10 seconds without impairing the clarity of the solution.

The calcium nonylnaphthalenesulfonate is advantageously prepared as follows:

Techincal nonylnaphthalene is sulfonated with 82% of its weight of sulfuric acid monohydrate until a test specimen of the sulfonation product is clearly soluble in water. The sulfonation mixture is then diluted with water until excess sulfuric acid can be separated. The sulfuric acid-free product is then neutralized with caustic soda solution, then dissolved in 40% ethanol and extracted with petroleum ether in order to remove unsulfonated constituents. The ethanol is then evaporated off and the product dissolved in a small quantity of water, hydrochloric acid added, the product dissolved in ether, dried with sodium sulfate and finally freed from ether.

The so-obtained sulfonic acid is admixed with 37.5% of its own weight of water and neutralized with the calculated quantity (11.5%) of calcium hydroxide, the calcium nonylnaphthalene sulfonate being obtained in the form of a paste.

The hereinbefore-described water-containing organic solvents are characterized by an outstanding dry cleaning action, particularly for the cleaning of textiles by the introductorily described conventional methods, the water being added directly by a conventional automatic dosing device to the dry-cleaning bath containing the goods to be cleaned. Perchlorethylene solutions constitute especially effective dry cleaning baths. All the solutions according to the invention have a minimal corroding action, e.g. on the metal container therefor.

Textile material dry cleaned with the cleaning solutions of the invention can thereafter be hydrophobised without difficulty.

As set forth, perchlorethylene is especially suited for the preparation of the dry cleaning solutions. If other solvents are used, or if the quantity of the compounds (a) and (b) is less than 2 g. per liter of the solvent, then the water is often not dissolved clearly in the dry cleaning solvent but it is nevertheless rapidly dispersed therein and the turbid dispersion thus obtained also has good cleansing power. Practical tests have shown that a good detergent action can be achieved when the solvents contain as little as 0.25 gram of the compounds (a) and (b) per liter, though the necessary quantity of water is not dissolved clearly in the dry cleaning solvents.

The dry cleaning solutions described above do not hinder the filtration of the dry cleaning baths after their use.

Having thus disclosed the invention, what is claimed is:

1. A dry cleaning solution with enhanced water absorbing capacity consisting essentially of a chlorinated hydrocarbon dry cleaning solvent having dissolved therein at least 0.25 grams per liter of said solvent of a mixture consisting of (*a*) an alkaline earth metal salt selected from the group consisting of calcium and magnesium of alkylarylsulfonic acid selected from the group consisting of alkylbenzene sulfonic acid and alkylnaphthalene sulfonic acid and (*b*) a surface active polyglycol ether wherein the lipophilic portion has from 12 to 18 carbon atoms and the hydrophilic portion has about 7 to 15 $CH_2CH_2O-$ groups; the ratio of (*a*) to (*b*) being 1:2 to 2:1 by weight.

2. A dry cleaning solution with enhanced water absorbing capacity consisting essentially of a chlorinated hydrocarbon dry cleaning solvent having dissolved therein at least 0.25 grams per liter of said solvent of a mixture consisting of (*a*) a calcium salt of alkylarylsulfonic acid selected from the group consisting of alkylbenzene sulfonic acid and alkylnaphthalene sulfonic acid and (*b*) a surface active polyglycol ether wherein the lipophilic portion has about 12 to 18 carbon atoms and the hydrophilic portion has about 7 to 15 $CH_2CH_2O-$ groups; the ratio of (*a*) to (*b*) being 1:2 to 2:1 by weight.

3. A dry cleaning solution according to claim 1, wherein the chlorinated hydrocarbon solvent contains 0.25 to 6 grams per liter of the mixture consisting of (*a*) and (*b*).

4. A dry cleaning solution according to claim 2, wherein the chlorinated hydrocarbon contains 0.25 to 6 grams per liter of the mixture of the calcium salt and surface active polyglycol ether.

5. A dry cleaning solution having enhanced water capacity consisting essentially of perchlorethylene having dissolved therein 0.25 to 6 grams per liter of a mixture of about equal parts by weight of magnesium dodecylbenzenesulfonate and a surface active polygylcol ether wherein the lipophilic portion has about 16 to 18 carbon atoms and the hydrophilic portion contains 10 to 15 $CH_2CH_2O-$ groups.

6. A dry cleaning solution according to claim 1, wherein the chlorinated hydrocarbon solvent is perchlorethylene.

7. A dry cleaning solution according to claim 2, wherein the chlorinated hydrocarbon is perchlorethylene.

8. A dry cleaning solution according to claim 2, wherein the alkylarylsulfonic acid is dodecylbenzenesulfonic acid.

9. A dry cleaning solution having enhanced water capacity consisting essentially of perchlorethylene having dissolved therein 0.25 to 6 grams per liter of a mixture of 100 parts by weight of calcium dodecylbenzenesulfonate and about 80 parts by weight of oleylpentadecaglycol ether.

10. A dry cleaning solution having enhanced water capacity consisting essentially of perchlorethylene having dissolved therein 0.25 to 6 grams per liter of a mixture of 100 parts by weight of calcium dodecylbenzenesulfonate and about 180 parts by weight of diamylphenyldodecaglycol ether.

11. A dry cleaning solution having enhanced water capacity consisting essentially of perchlorethylene having dissolved therein 0.25 to 6 grams per liter of a mixture of 100 parts by weight of calcium dodecylbenzenesulfonate and about 180 parts by weight of lauryloctaglycol ether.

12. A dry cleaning solution having enhanced water capacity consisting essentially of perchlorethylene having dissolved therein 0.25 to 6 grams per liter of a mixture of 100 parts by weight of calcium dodecylbenzenesulfonate and about 120 parts by weight of isooctylphenyldecaglycol ether.

13. A dry cleaning solution having enhanced water capacity consisting essentially of perchlorethylene having dissolved therein 0.25 to 6 grams per liter of a mixture of 100 parts by weight of calcium dodecylbenzenesulfonate and about 180 parts by weight of nonylphenyldecaglycol ether.

14. A dry cleaning solution having enhanced water capacity consisting essentially of perchlorethylene having dissolved therein 0.25 to 6 grams per liter of a mixture of 100 parts by weight of calcium dibutylnaphthalene sulfonate and about 80 parts by weight of isooctylphenyldecaglycol ether.

15. A dry cleaning solution having enhanced water capacity consisting essentially of perchlorethylene having dissolved therein 0.25 to 6 grams per liter of a mixture of 100 parts by weight of calcium nonylnaphthalene sulfonate and about 100 parts by weight of isooctylphenyldecaglycol ether.

16. A dry cleaning solution according to claim 2, wherein the chlorinated hydrocarbon is trichlorethylene.

17. A method of imparting enhanced water absorbing capacity to a chlorinated hydrocarbon dry cleaning solvent which comprises incorporating therein 0.25 to 6 grams per liter of said solvent of a mixture of (a) an alkaline earth metal salt selected from the group consisting of calcium and magnesium of alkylarylsulfonic acid selected from the group consisting of alkylbenzene sulfonic acid and alkylnaphthalene sulfonic acid and (b) a surface active polyglycol ether wherein the lipophilic portion contains about 12 to 18 carbon atoms and the hydrophilic portion contains about 7 to 15 $CH_2CH_2O$— groups the ratio of (a) to (b) being 1:2 to 2:1 by weight.

18. A method of imparting enhanced water absorbing capacity to a chlorinated hydrocarbon dry cleaning solvent which comprises incorporating therein 0.25 to 6 grams per liter of said solvent of a mixture of (a) an alkaline earth metal salt selected from the group consisting of calcium and magnesium of dodecylbenzenesulfonic acid and (b) a surface active polyglycol ether wherein the lipophilic portion contains about 12 to 18 carbon atoms and the hydrophilic portion contains about 7 to 15 $CH_2CH_2O$— groups the ratio of (a) to (b) being 1:2 to 2:1 by weight.

References Cited by the Examiner

UNITED STATES PATENTS

| | | | |
|---|---|---|---|
| 2,271,635 | 2/1942 | Flett | 252—161 |
| 2,872,368 | 2/1959 | Sanders et al. | 252—353 |
| 2,941,952 | 6/1960 | Lewis et al. | 252—161 |
| 2,945,818 | 7/1960 | Costine et al. | 252—353 |
| 3,057,676 | 10/1962 | Wedell. | |
| 3,091,508 | 5/1963 | Edwards. | |

LEON D. ROSDOL, *Primary Examiner.*

JULIUS GREENWALD, *Examiner.*

W. E. SCHULTZ, *Assistant Examiner.*